US010467405B2

(12) United States Patent
Martin et al.

(10) Patent No.: US 10,467,405 B2
(45) Date of Patent: Nov. 5, 2019

(54) FORMAT PRESERVING ENCRYPTION OF FLOATING POINT DATA

(71) Applicant: EntIT Software LLC, Sunnyvale, CA (US)

(72) Inventors: Luther Martin, San Jose, CA (US); Timothy Roake, Palo Alto, CA (US)

(73) Assignee: Micro Focus LLC, Santa Clara, CA (US)

( * ) Notice: Subject to any disclaimer, the term of this patent is extended or adjusted under 35 U.S.C. 154(b) by 101 days.

(21) Appl. No.: 15/496,282

(22) Filed: Apr. 25, 2017

(65) Prior Publication Data

US 2018/0309733 A1 Oct. 25, 2018

(51) Int. Cl.
G06F 5/00 (2006.01)
G06F 21/52 (2013.01)
G06F 21/62 (2013.01)

(52) U.S. Cl.
CPC .............. *G06F 21/52* (2013.01); *G06F 5/00* (2013.01); *G06F 21/6209* (2013.01); *G06F 2221/2107* (2013.01)

(58) Field of Classification Search
CPC ................................................ H04L 63/0428
See application file for complete search history.

(56) References Cited

U.S. PATENT DOCUMENTS 5,603,047 A 2/1997 Caulk, Jr.
7,685,214 B2 3/2010 Chen et al.
8,151,110 B2 4/2012 Vantalon et al.
8,948,376 B2 2/2015 Hoover
9,177,111 B1 11/2015 Squires
9,202,079 B2 12/2015 Kaliski
9,208,491 B2 12/2015 Spies et al.
9,436,525 B2 9/2016 Illowsky et al.
9,582,332 B2 2/2017 Hiremane
9,635,011 B1* 4/2017 Wu ..................... H04L 63/0807
2006/0242702 A1 10/2006 McIntosh
2010/0211781 A1 8/2010 Auradkar
2011/0022854 A1 1/2011 MacChetti
(Continued)

FOREIGN PATENT DOCUMENTS

JP 2006025436 1/2006

OTHER PUBLICATIONS

IEEE Std 754-1985 (ANSI, IEEE Standard for Binary Floating-Point Arithmetic, 1985, 20 pages) (Year: 1985).*
(Continued)

*Primary Examiner* — Oleg Korsak

(57) ABSTRACT

Format preserving encryption of floating point data is disclosed. One example is a system including at least one processor and a memory storing instructions executable by the at least one processor to receive floating point data to be secured, where the floating point data comprises a sign bit, exponent bits and fraction bits. A format preserving encryption (FPE) is applied to the received data, where the FPE is applied separately to the sign bit, the exponent bits and the fraction bits to generate an encrypted floating point data comprising an encrypted sign bit, encrypted exponent bits and encrypted fraction bits. The encrypted floating point data is provided to a service provider as a secure representative of the received data.

20 Claims, 3 Drawing Sheets

(56) References Cited

U.S. PATENT DOCUMENTS

| | | |
|---|---|---|
| 2011/0103579 A1* | 5/2011 | Martin .............. G06F 21/602 380/28 |
| 2011/0280394 A1 | 11/2011 | Hoover |
| 2013/0007467 A1 | 1/2013 | Chan et al. |
| 2013/0168450 A1 | 7/2013 | von Mueller et al. |
| 2013/0232578 A1 | 9/2013 | Chevallier-Mames et al. |
| 2014/0229742 A1 | 8/2014 | Heen et al. |
| 2015/0186296 A1 | 7/2015 | Guidry |
| 2015/0326388 A1 | 11/2015 | Sim et al. |
| 2016/0006703 A1 | 1/2016 | Boivie et al. |
| 2016/0182543 A1 | 6/2016 | Aabye et al. |
| 2017/0177504 A1 | 6/2017 | Desai |

OTHER PUBLICATIONS

Alghamdi et al. (A Software Tool for Floating Point Interval Analysis with Improved Precision for Javascript-based Medical Applications, 2016 IEEE, pp. 659-662) (Year: 2016).*

Kaplan et al. (The Error in the Double Precision Representation of Julian Dates, AA Technical Note Feb. 2011, 4 pages) (Year: 2011).*

Düben et al. (Benchmark Tests for Numerical Weather Forecasts on Inexact Hardware, American Meteorological Society, 2014, 21 pages) (Year: 2014).*

Arnold (The Patriot Missile Failure, Aug. 23, 2000, 1 page) (Year: 2000).*

Xie et al. (Fast Lossless Compression of Seismic Floating-Point Data, 2009, IEEE pp. 235-238) (Year: 2009).*

Luther Martin, U.S. Appl. No. 15/496,285 entitled Secure Representation Via a Format Preserving Hash Function filed Apr. 25, 2017 (24 pages).

Luther Martin, U.S. Appl. No. 15/496,287 entitled Format Preserving Encryption of Object Code filed Apr. 25, 2017 (24 pages).

Liu, X. et al., Privacy-preserving Outsourced Calculation on Floating Point Numbers, Jun. 27, 2016 (17 pages).

Kim, K. et al., Encoding of Korean Characters with Less Radix in Format-preserving Encryption, Dec. 17, 2015 (3 pages).

Bellare, M. et al., Format-preserving Encryption, 2009 (25 pages).

https://www.comforte.com/products/protect/securdps/securdps-password-protection/—Securdata is Now a Core Part of Securdps, Mar. 4, 2016 (4 pages).

https://www.voltage.com/technology/data-encryption/hpe-format-preserving-encryption/—Format-Preserving Encryption (FPE), DataMasking, Datatype Agnostic, Referential Integrity, HPE Security—Data Security, 2015 (5 pages).

Himangi, G., Code Protection and Obfuscation of net Software Using Crypto Obfuscator, Jul. 20, 2010 (6 pages).

Dworkin, Morris, NIST Special Publication 800-38G, Recommendation for Block Cipher Modes of Operation: Methods for Format-Preserving Encryption, Mar. 2016 (28 pages).

Wikipedia, MIPS instruction set dated on or before Mar. 24, 2017 (22 pages).

* cited by examiner

FORMAT PRESERVING ENCRYPTION OF FLOATING POINT DATA

BACKGROUND

Floating point data is used to represent a variety of scientific measurements. In some instances, such data is sensitive, and in need of protection.

BRIEF DESCRIPTION OF THE DRAWINGS

Some implementations of the present disclosure are described with respect to the following figures.

DETAILED DESCRIPTION

Figure 1:
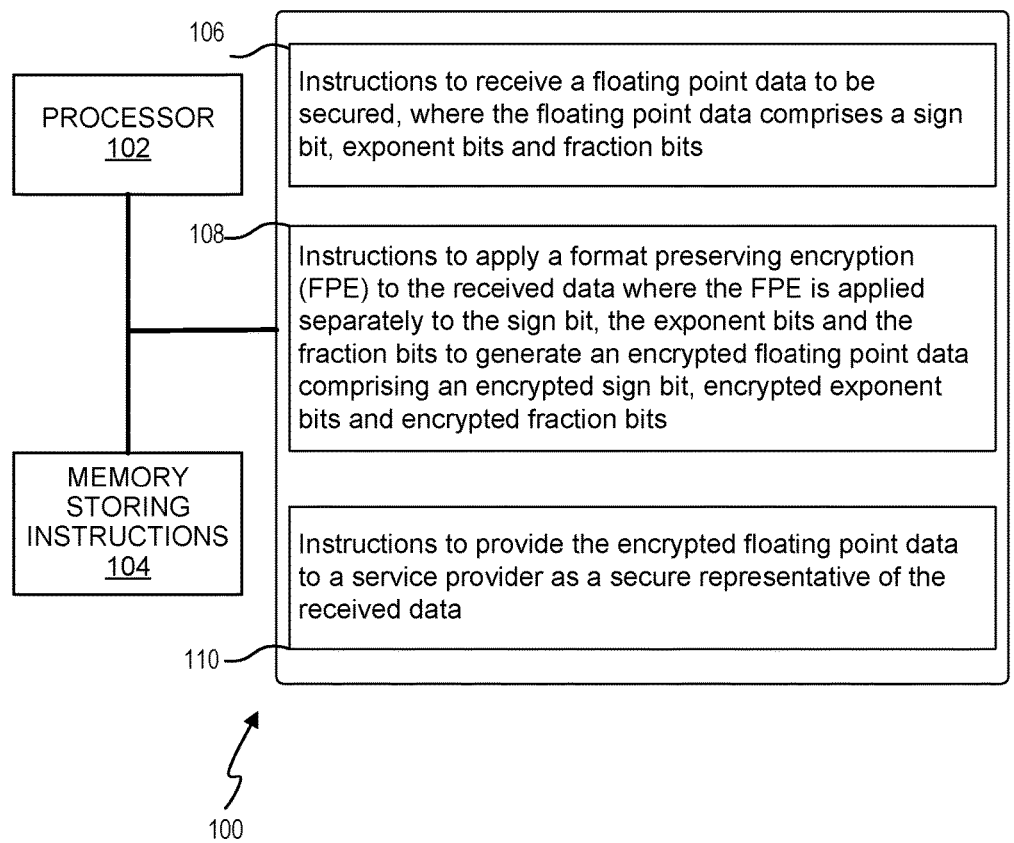
FIG. 1 is a block diagram illustrating one example of a system for format preserving encryption of floating point data.

A floating point value generally includes a sign bit, one or more exponent bits, and one or more fraction bits. Generally, floating point data represents values whose magnitudes are very large or very small to be represented by fixed point data. In some examples, floating point data may be utilized to minimize precision loss in calculations where a difference between terms may be of considerably large magnitude. Accordingly, floating point data are widely utilized to represent values in fields ranging from astronomy, meteorology, chemistry, healthcare, and so forth.

In many instances, floating point data represent sensitive data that requires special handling. This includes additional protocols to safeguard and protect the confidentiality of the sensitive data. Such additional protocols require additional resources that may still be vulnerable to attack from hostile elements. Accordingly, there is a need to improve security of the sensitive data with a minimal impact on businesses that must process such sensitive data.

For example, highly sensitive scientific data may be transferred from one entity to another. For example, highly sensitive scientific data may be transmitted from the International Space Station. Also, for example, highly sensitive military data (e.g., geo-positional data of a target) may be transmitted from an active military hotspot. Such data transmission may be vulnerable to malicious attacks, thereby exposing the sensitive data, and causing substantial losses, including potential loss of human lives, or unmasking of covert assets. Accordingly, there is a need to increase the security of the sensitive information by minimizing the burden on service providers that process such data, and also without impacting the user experience in transmitting data.

In some instances, a ciphertext derived from sensitive data may be transmitted instead of the sensitive data itself. However, existing techniques that employ various encryption algorithms produce output data that is pseudo-random. Accordingly, the output may have an appearance of random bits, and may generally not resemble the format of the sensitive data itself. Accordingly, when such data is encrypted, they may lose their structured format as a sign bit, exponent bits, and fraction bits. However, many systems are designed to process data that has a specific format. Consequently, when the encrypted output does not resemble the format of the input data, such systems may be unable to continue processing the data. Accordingly, there is a need to apply a format preserving encryption to secure the input data and allow existing systems to process these with minimal detrimental impact.

As described in various examples herein, format preserving encryption of floating point data is disclosed. One example is a system including at least one processor and a memory storing instructions executable by the at least one processor to receive floating point data to be secured, where the floating point data comprises a sign bit, exponent bits and fraction bits. A format preserving encryption (FPE) is applied to the received data, where the FPE is applied separately to the sign bit, the exponent bits and the fraction bits to generate an encrypted floating point data comprising an encrypted sign bit, encrypted exponent bits and encrypted fraction bits. The encrypted floating point data is provided to a service provider as a secure representative of the received data.

As described herein, format preserving encryption of floating point data solves a problem necessarily rooted in technology. Electronic processing systems are ubiquitous, generating and transacting high volumes of data at a very high speed. Sensitive data is being processed at a very high rate. Such high volumes of high speed data transfers are generally accompanied by a scourge of online phishing, hacking, and other unauthorized activities directed at intercepting, modifying, misdirecting, and/or misusing such highly sensitive data. Accordingly, the techniques disclosed herein solve a technological problem of securing such electronic data. In performing these security enhancements, the functioning of the computer is enhanced as well, since existing systems do not have to be modified to receive the encrypted data. The technology described herein is applied within a large connected networks of computers, as for example, a communications system, a healthcare system, an internet of things, and so forth.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for format preserving encryption of floating point data. System 100 is shown to include a processor 102, and a memory 104 storing instructions 106-110 to perform various functions of the system.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, including a network of cloud computing resources, and may include any number of hubs, routers, switches, cell towers, and so forth. Such a network may be, for example, part of a cellular network, part of the internet, part of an intranet, and/or any other type of network.

Memory 104 may store instructions 106 to receive a floating point data to be secured, where the floating point data comprises a sign bit, exponent bits and fraction bits. For example, the binary64 format (double precision) has one sign bit, 11 exponent bits and 52 fraction bits. As another example, the binary32 format (single precision) has one sign bit, 8 exponent bits and 23 fraction bits. These formats are respectively identical to the single and double formats of the IEEE 754-1985 standard, and are widely adopted.

Generally, the data may be received in structured form, and may need to be secured so as to prevent malicious use of the data. In some examples, the instructions 106 may include instructions to identify the received data to be a floating point data, and further identify a sign bit, an exponent bit and a fraction bit in the received data.

In some examples, the received data may represent medical data. For example, the data may be scientific data representing test results. Such data is highly sensitive and needs to be protected under HIPAA. Also, for example, systems that process such data are generally designed to receive the data in a specific scientific format. Accordingly, preserving the format of the received data during encryption is crucial to allowing existing systems to continue functioning without performance issues.

In some examples, the received data may represent astronomical data. For example, the data may be received from a satellite, a probe, a telescope, the international space station, and so forth. Astronomical data is representative of large variances in measured magnitudes. Such data is generally represented as floating point data. Moreover, such data may be vulnerable to malicious activity and so there is a need to protect such data.

In some examples, the received data may represent meteorological data. For example, the data may be received from a weather satellite, a meteorological observation site, and so forth. In some examples, the received data may be collected from observation posts and/or sensors located at various positions. Such sensor data may be, for example, seismic data received from earthquake prone locations, and data from early warning systems associated with tsunamis, volcanic activities, cyclones, tornados, and so forth.

In some examples, the received data may represent military data. For example, the data may be received from a military vehicle, a naval vessel, an aircraft, and so forth. The data may relate to geo-positional data, chemical, biological, or nuclear test data, and so forth. Also, for example, the received data may relate to airline tracking data and/or in-flight communications data.

In some examples, the received floating point data may represent a quasi-identifier from an edge device in an Internet of Things (IoT), where the quasi-identifier is not directly associated with a private entity. A quasi-identifier, as used herein, generally refers to an identifier that may not directly identify an entity, but may be utilized in combination with another quasi-identifier to identify an entity. For example, gender, postal code and date of birth may not individually identify a user uniquely. However, it may be possible to identify the user when the quasi-identifiers are used in combination. Accordingly, there may be a need to secure a quasi-identifier so as to prevent aggregation of information that could ultimately result in a loss of secured information.

Memory 104 may store instructions 108 to apply a format preserving encryption (FPE) to the received data, where the FPE is applied separately to the sign bit, the exponent bits and the fraction bits to generate an encrypted floating point data comprising an encrypted sign bit, encrypted exponent bits and encrypted fraction bits.

Generally, as used herein, FPE is a mode of advanced encryption standard (AES) encryption. As an illustrative example, it may be an AES encryption as described by the NIST SP800-38G Standard and accepted by the PCI Security Standards Council (SSC) as strong encryption.

Memory 104 may store instructions 110 to provide the encrypted floating point data to a service provider as a secure representative of the received data. As described herein, when the format of the received data is preserved during encryption, substantial cost savings may be achieved since existing systems continue to process the data without additional modifications. For example, data processing, data storage, data transmission, and so forth may be based on a specific format of the data. Such systems expect the data to be in a form comprising a sign bit, an exponent bit and a fraction bit. Accordingly, when the encrypted data is provided as an encrypted sign bit, encrypted exponent bits and encrypted fraction bits, the systems may be agnostic to the transformation of the underlying data, and continue to process data without changes in processor logic or other systems configurations. Accordingly, existing systems are able to process the output sequence since the format may be preserved.

Generally, the components of system 100 may include programming and/or physical networks to be communicatively linked to other components of each respective system. In some instances, the components of each system may include a processor and a memory, while programming code is stored and on that memory and executable by a processor to perform designated functions.

Generally, the system components may be communicatively linked to computing devices. A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
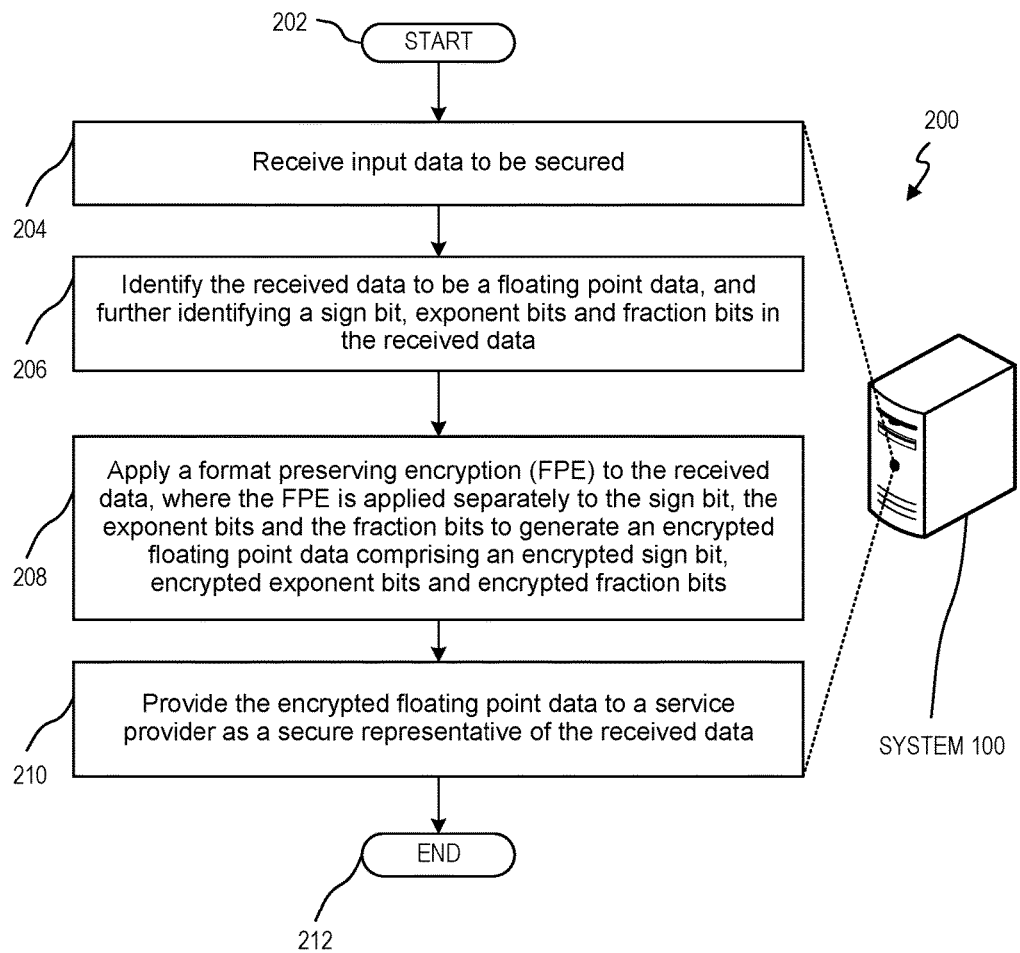
FIG. 2 is a flow diagram illustrating one example of a method for format preserving encryption of floating point data.

FIG. 2 is a flow diagram illustrating one example of a method for format preserving encryption of floating point data. In some examples, such an example method may be implemented by a system such as, for example, system 100 of FIG. 1. The method 200 may begin at block 202, and continue to end at block 210.

At 204, an input data to be secured may be received.

At 206, the received data may be identified as a floating point data, and a sign bit, exponent bits and fraction bits in the received data may be further identified.

At 208, a format preserving encryption (FPE) may be applied to the received data, where the FPE is applied separately to the sign bit, the exponent bits and the fraction bits to generate an encrypted floating point data comprising an encrypted sign bit, encrypted exponent bits and encrypted fraction bits.

At 210, the encrypted floating point data may be provided to a service provider as a secure representative of the received data.

In some examples, the input data may represent sensitive data.

In some examples, the sensitive data may be medical data, astronomical data, meteorological data, military data, or seismic data.

In some examples, the sensitive data may be a quasi-identifier from an edge device in an Internet of Things (IoT), where the quasi-identifier is not directly associated with a private entity.

Figure 3:
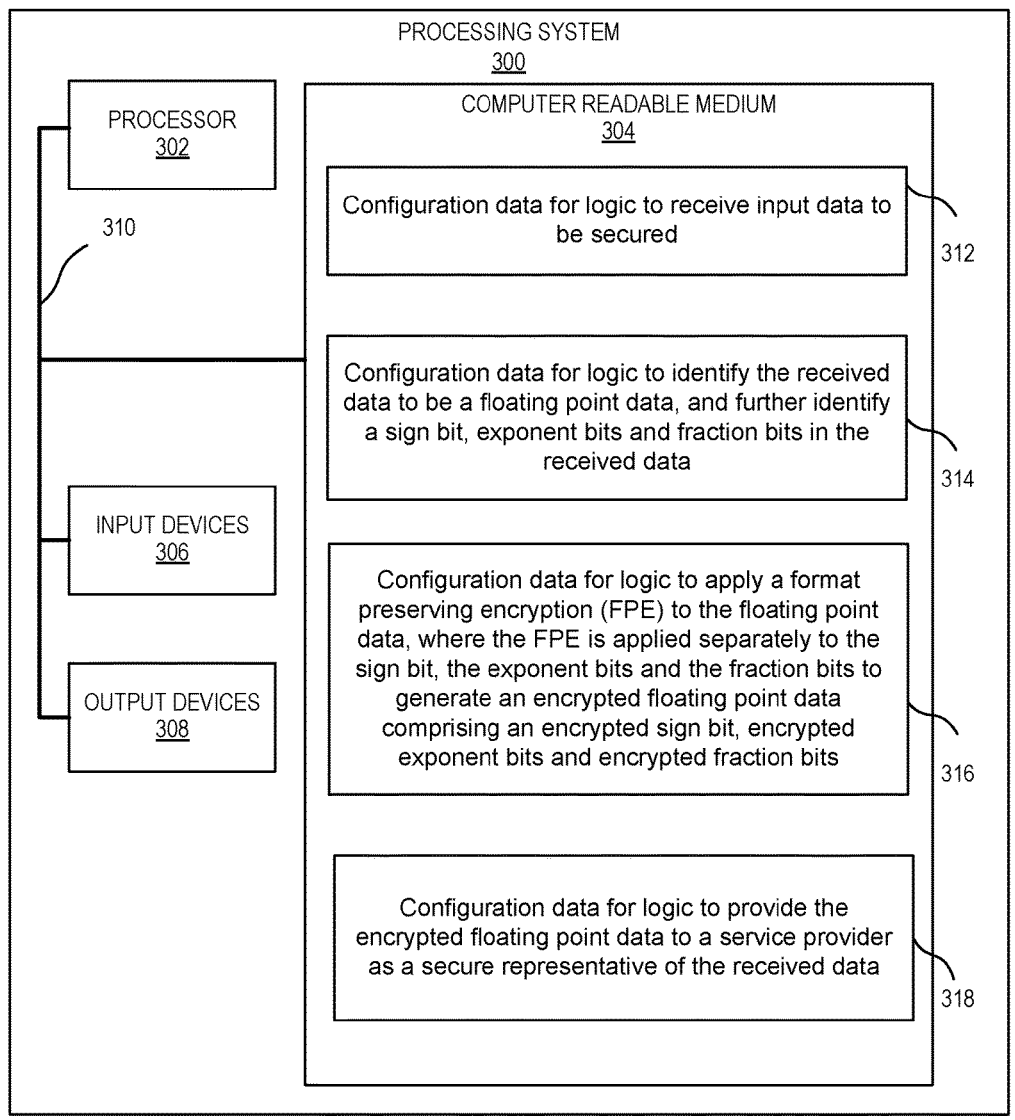
FIG. 3 is a block diagram illustrating one example of a computer readable medium for format preserving encryption of floating point data.

FIG. 3 is a block diagram illustrating one example of a computer readable medium for format preserving encryption of floating point data. Processing system 300 includes a processor 302, a computer readable medium 304, input devices 306, and output devices 308. Processor 302, computer readable medium 304, input devices 306, and output devices 308 are coupled to each other through a communication link (e.g., a bus). In some examples, the non-transitory, computer readable medium 304 may store configuration data for the logic to perform the various functions of the processor 302.

Processor 302 executes instructions included in the computer readable medium 304 that stores configuration data for logic to perform the various functions. Computer readable medium 304 stores configuration data for logic 312 to receive input data to be secured.

Computer readable medium 304 stores configuration data for logic 314 to identify the sensitive data to be a floating point data comprising a sign bit, exponent bits and fraction bits.

Computer readable medium 304 stores configuration data for logic 316 to apply a format preserving encryption (FPE) to the floating point data, where the FPE is applied separately to the sign bit, the exponent bits and the fraction bits to generate an encrypted floating point data comprising an encrypted sign bit, encrypted exponent bits and encrypted fraction bits.

Computer readable medium 304 stores configuration data for logic 318 to provide the encrypted floating point data to a service provider as a secure representative of the received data.

In some examples, the received input data may be sensitive data.

In some examples, the sensitive data may be medical data, astronomical data, meteorological data, military data, or seismic data.

In some examples, the sensitive data may be a quasi-identifier from an edge device in an Internet of Things (IoT), where the quasi-identifier is not directly associated with a private entity.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 304 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage containers.

As described herein, various components of the processing system 300 are identified and refer to a combination of hardware and programming to perform a designated visualization function. As illustrated in FIG. 2, the programming may be processor executable instructions stored on tangible computer readable medium 304, and the hardware may include Processor 302 for executing those instructions. Thus, computer readable medium 304 may store program instructions that, when executed by Processor 302, implement the various components of the processing system 300.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 304 may be any of a number of memory components capable of storing instructions that can be executed by processor 302. Computer readable medium 304 may be non-transitory in the sense that it does not encompass a transitory signal but instead is made up of memory components to store the relevant instructions. Computer readable medium 304 may be implemented in a single device or distributed across devices. Likewise, processor 302 represents any number of processors capable of executing instructions stored by computer readable medium 304. Processor 302 may be integrated in a single device or distributed across devices. Further, computer readable medium 304 may be fully or partially integrated in the same device as processor 302 (as illustrated), or it may be separate but accessible to that device and processor 302. In some examples, computer readable medium 304 may be a machine-readable storage medium.

The general techniques described herein provide a way to apply format preserving encryption to floating point data. One benefit of the techniques described herein is that the format of the input data is preserved. This makes it useful for the encrypted output to be processed in many legacy environments.

Although specific examples have been illustrated and described herein, there may be a variety of alternate and/or equivalent implementations that may be substituted for the specific examples shown and described without departing from the scope of the present disclosure. This application is intended to cover any adaptations or variations of the specific examples discussed herein.

The invention claimed is:

1. A system comprising:
   at least one processor; and
   a memory storing instructions executable by the at least one processor to:
      receive a floating point data to be secured, wherein the floating point data comprises a sign bit, exponent bits and fraction bits;
      apply a format preserving encryption (FPE) to the received floating point data, wherein the FPE is applied separately to the sign bit, the exponent bits and the fraction bits to generate an encrypted floating point data comprising an encrypted sign bit, encrypted exponent bits and encrypted fraction bits; and
      provide the encrypted floating point data to a service provider as a secure representative of the received floating point data.

2. The system of claim 1, wherein the instructions to receive the floating point data further comprise instructions to identify the sign bit, the exponent bits and the fraction bits in the received floating point data.

3. The system of claim 1, wherein a format of the encrypted floating point data matches a format of the received floating point data.

4. The system of claim 1, wherein the floating point data comprises one sign bit, 11 exponent bits and 52 fraction bits.

5. The system of claim 1, wherein the floating point data comprises one sign bit, 8 exponent bits and 23 fraction bits.

6. The system of claim 1, wherein the encrypted floating point data does not directly identify an entity.

7. The system of claim 1, wherein the floating point data represents a quasi-identifier from an edge device in an Internet of Things (IoT), wherein the quasi-identifier is not directly associated with a private entity.

8. A method, comprising:
    receiving, by a hardware processor, input data to be secured;
    identifying, by the hardware processor, the received input data as floating point data, and further identifying a sign bit, exponent bits and fraction bits in the received input data;
    in response to an identification of the received input data as floating point data:
        applying, by the hardware processor, a format preserving encryption (FPE) to the received data, wherein the FPE is applied separately to the sign bit, the exponent bits and the fraction bits to generate an encrypted floating point data comprising an encrypted sign bit, encrypted exponent bits and encrypted fraction bits; and
        providing, by the hardware processor, the encrypted floating point data to a service provider as a secure representative of the received input data.

9. The method of claim 8, wherein a format of the encrypted floating point data matches a format of the input data, wherein the input data represents sensitive data.

10. The method of claim 8, wherein the input data comprises one sign bit, 11 exponent bits and 52 fraction bits.

11. The method of claim 10, wherein the encrypted floating point data comprises one encrypted sign bit, 11 encrypted exponent bits and 52 encrypted fraction bits.

12. The method of claim 8, wherein the input data comprises one sign bit, 8 exponent bits and 23 fraction bits.

13. The method of claim 12, wherein the encrypted floating point data comprises one encrypted sign bit, 8 encrypted exponent bits and 23 encrypted fraction bits.

14. The method of claim 9, wherein the sensitive data is a quasi-identifier from an edge device in an Internet of Things (IoT), wherein the quasi-identifier is not directly associated with a private entity.

15. A non-transitory computer readable medium comprising executable instructions to:
    receive input data to be secured;
    identify the received input data to be a floating point data, and further identifying a sign bit, exponent bits and fraction bits in the received input data;
    apply a format preserving encryption (FPE) to the floating point data, wherein the FPE is applied separately to the sign bit, the exponent bits and the fraction bits to generate an encrypted floating point data comprising an encrypted sign bit, encrypted exponent bits and encrypted fraction bits; and
    provide the encrypted floating point data to a service provider as a secure representative of the received input data.

16. The computer readable medium of claim 15, wherein a format of the encrypted floating point data matches a format of the received input data, wherein the received input data is sensitive data.

17. The computer readable medium of claim 15, wherein the received input data comprises one sign bit, 11 exponent bits and 52 fraction bits.

18. The computer readable medium of claim 17, wherein the encrypted floating point data comprises one encrypted sign bit, 11 encrypted exponent bits and 52 encrypted fraction bits.

19. The computer readable medium of claim 15, wherein the input data comprises one sign bit, 8 exponent bits and 23 fraction bits.

20. The computer readable medium of claim 16, wherein the sensitive data represents a quasi-identifier from an edge device in an Internet of Things (IoT), wherein the quasi-identifier is not directly associated with a private entity.

\* \* \* \* \*